United States Patent
Dunmyer, Jr. et al.

[11] 3,811,844
[45] May 21, 1974

[54] ROTATING DISC CONTACTOR DRAW-OFF SYSTEM

[75] Inventors: Joseph C. Dunmyer, Jr.; Rino L. Godino, both of Livingston, N.J.

[73] Assignee: Foster Wheeler Corporation, Livingston, N.J.

[22] Filed: Feb. 22, 1973

[21] Appl. No.: 334,784

[52] U.S. Cl. ............... 23/270.5, 196/14.52, 261/84
[51] Int. Cl. .......................................... B01d 11/04
[58] Field of Search ................ 23/270.5; 196/14.52; 261/84

[56] References Cited
UNITED STATES PATENTS

| | | | |
|---|---|---|---|
| 2,273,660 | 2/1942 | Poole | 196/14.52 |
| 2,877,101 | 3/1959 | Rector | 196/14.52 |
| 2,893,846 | 7/1959 | Wistrich et al. | 23/270.5 |
| 3,015,545 | 1/1962 | Gross et al. | 23/270.5 |
| 3,627,675 | 12/1971 | Ditman et al. | 196/14.52 |

FOREIGN PATENTS OR APPLICATIONS

| | | | |
|---|---|---|---|
| 904,757 | 8/1962 | Great Britain | 23/270.5 |

*Primary Examiner*—Tim R. Miles
*Attorney, Agent, or Firm*—Marvin A. Naigur; John E. Wilson

[57] ABSTRACT

The invention deals with an apparatus for treating asphaltic feed stock in which a hydrocarbon solvent is introduced into a compartmentalized contacting tower below the feed stock, and a wash oil solvent is introduced above the feed stock. The contacting tower is formed with an enlarged central compartment in which there is provided an annularly shaped accumulator basin for reducing the flow of the dispersed phase and recycling the dispersed phase back to the upper portion of the tower.

5 Claims, 1 Drawing Figure

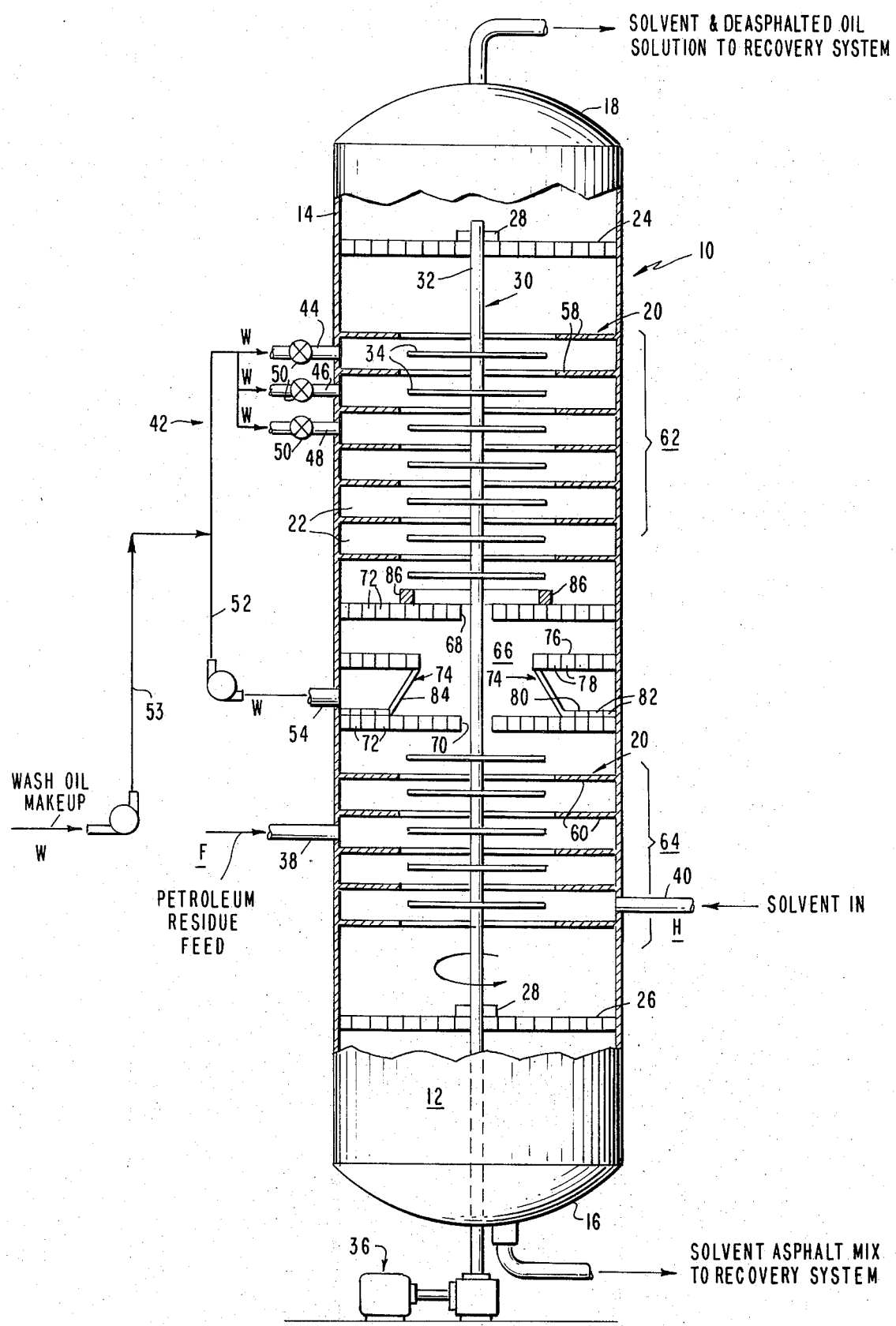

ROTATING DISC CONTACTOR DRAW-OFF SYSTEM

BACKGROUND OF THE INVENTION

Petroleum residue is composed of asphaltic components and nonasphaltic components which are usually referred to respectively as asphalt and deasphalted oil. The separation of the deasphalted oil from the asphalt is generally achieved through the use of light hydrocarbon solvents which exhibit preferential solubility with respect to the deasphalted oil. The separation takes place in contacting devices which afford multiple stage countercurrent contacting of the solvent and petroleum residue. The present invention is generally applicable to rotating disc type contactors, and specifically relates to the continuous withdrawal of the dispersed phase. In the usual type of contacting tower, there is no provision for recycling a portion of the dispersed phase to the upper part of the tower or recovery of the dispersed phase for use as another interim phase. Thus, the present invention affords new and superior means of washing the dispersed phase in a contacting tower for the removal of undesirable products associated with the feed stock, such as small particles. In this manner, the undesirable products are eliminated from the deasphalted oil or the asphalt product. Also, while the present invention is particularly applicable to deasphalting operations as outlined above, it also finds use in the removal of the dispersed phase in a liquid-liquid extraction operation.

SUMMARY OF THE INVENTION

In accordance with an illustrative embodiment demonstrating features and advantages of the present invention, there is provided an apparatus for separating a dispersed phase through the countercurrent contact in a contacting tower defined by an elongated column formed with an internal chamber. A plurality of annular stator rings are spaced apart from each other and mounted in the internal chamber to form a series of vertically disposed compartments. A rotor including a shaft is rotatably mounted in the internal chamber and a plurality of rotor blades are mounted on the shaft such that each of the rotor blades are disposed within each of the compartments. Also provided are means for conveying the feed stock into one of the compartments, means for conveying a hydrocarbon solvent into one of the compartments, and means for conveying a wash oil solvent into one of the compartments which is located above the compartment receiving the feed stock. The stator rings are separated into an upper group of rings and a lower group of rings such that an enlarged central compartment is formed which is medially located with respect to the vertical axis of the column. Means are provided in the central compartment for reducing the movement of the dispersed phase. This includes an annularly shaped accumulator basin formed with a plurality of perforations for receiving a portion of the dispersed phase for recycling back to the upper group of rings.

BRIEF DESCRIPTION OF THE DRAWING

The above brief description, as well as further objects, features and advantages of the present invention will be more fully appreciated by reference to the following detailed description of a presently preferred, but nonetheless illustrative embodiment in accordance with the present invention, when taken in connection with the accompanying drawing wherein a schematic diagram of a contacting tower is illustrated.

DESCRIPTION OF THE PREFERRED EMBODIMENT

With reference to FIG. 1, there is shown schematically a contacting tower 10 for treating petroleum residue containing feed stock designated by the letter F. The contacting tower 10 is in the shape of an elongated column formed with an internal chamber 12 which is defined by a cylindrical wall 14, a bottom wall 16, and a top wall 18. A plurality of annular stator rings 20 are mounted in internal chamber 12 on cylindrical wall 14 to form a series of vertically disposed compartments 22 within the internal chamber 12. An upper calming grid 24 and lower calming grid 26 are mounted on cylindrical wall 14 and bearing assemblies 28 are secured to the calming grids. Rotatably mounted in the bearing assemblies 28 is a rotor 30 which includes a shaft 32 and a series of rotor blades 34 mounted along the length of the shaft 32. Each of the rotor blades 34 are located in one of the compartments 22 such that the blades 34 are medially disposed along the length of compartments 22. A variable speed gear motor 36 is coupled to shaft 32 for imparting rotation to the rotor blades 34.

The feed stock F is introduced into one of the compartments 22 by means of a conduit 38; a hydrocarbon solvent, designated H is introduced into one of the compartments 22 located below the compartment receiving the feed stock F by means of a solvent conduit 40; and wash oil solvent, designated W is introduced into the compartments 22.

For allowing flexibility in the recycle of the wash oil W, there is provided a wash oil solvent network 42 which includes three wash oil conduits 44, 46 and 48, each of which has a valve 50 in order to afford adjustment to optimum operating conditions. After optimum operation has been established, two of the valves 48 are closed and the optimum wash oil solvent conduit is placed in operation.

The network 42 is comprised of a recycle line 52 in flow communication with dispersed phase draw-off nozzles 54 which are formed on cylindrical wall 14 and the conduits 44, 46, 48 and a wash oil make-up line 53 which is in flow communication with recycle line 52. When necessary, additional wash oil W can be introduced into the chamber 12 by means of the make-up line 53 which is connected to recycle line 52.

The stator rings 20 are separated into an upper group of rings 58 and a lower group of rings 60, such that the compartments 22 form an upper group of compartments 62 and a lower group of compartments 64, respectively. Medially located along the vertical axis of cylindrical wall 14 is an enlarged central compartment 66 which separates the upper compartments 62 from the lower compartments 64. In order to reduce the movement of the dispersed phase in central compartment 66, an upper intermediate calming grid 68 and lower intermediate calming grid 70 are mounted at the upper boundary and lower boundary of central compartment 66, respectively. The grids 68 and 70 are formed with a plurality of perforations 72 for allowing passage through the grids 68 and 70.

An annularly shaped accumulator basin 74 is mounted between the grids 68 and 70 on wall 14 in internal chamber 12. The accumulator basin 74 is defined by an upper grid wall 76 formed with a plurality of perforations 78 and a lower grid wall 80 formed with a plurality of weep holes 82. The number and size of the weep holes 82 depends on the properties of the material being drawn-off. The upper grid wall 76 and lower grid wall 80 are separated by a frustoconical wall 84. Thus, the accumulator basin 74 forms a complete circuit along the interior of wall 14.

A weir baffle 86 in the shape of a cylindrical wall is mounted on top of intermediate calming grid 68 in a position equidistant from the shaft 32 and wall 14. In this manner, the weir baffle 86 and intermediate calming grid 68 define a complete circuit equidistant from the wall 14.

In the operation of the contacting tower 10, the dispersed phase is passed through the internal chamber 12 in countercurrent relation with respect to the continuous phase, and in the direction of the grid wall 76 of accumulator basin 74. It should be understood that by dispersed phase, applicant means droplets or globules that are settling throughout the continuous phase, which is the remaining liquid present in the internal chamber 12. The rotation of the rotor blades 34 adjacent the compartments 22 causes the dispersed phase to proceed along the length of shaft 32, as well as across the horizontal plane of blades 34 to the wall 14 and back to the center of blades 34 in the vicinity of shaft 32. Upon contacting the weir baffle 86, the dispersed phase is prevented from returning to the center portion of the rotating blade 34, such that the dispersed phase proceeds down through the grids 72 and 76 into the accumulator basin 74. In this manner, the grids 68, 76 and 70 provide a completely calm section for accumulator basin 74, with a minimal degree of dispersed phase by-pass around accumulator basin 74. The dispersed phase from accumulator basin 74 is then pumped out through nozzle 54 into the solvent network 42. Any material which settles out in the accumulator basin 74 will pass through the weep holes 82 and the perforations 72 in calming grid 70 into the lower group of compartments 64. If there is an excess amount of dispersed phase in the accumulator basin 74 beyond the capacity thereof, this excess dispersed phase will pass through grid wall 76 into the central compartment 66. Thus, in accordance with the contacting tower 10 of the present invention, it is possible to separately withdraw the dispersed phase which is present in the internal chamber 12 during the liquid-to-liquid extraction operation.

A latitude of modification, change and substitution is intended in the foregoing disclosure and in some instances some features of the invention will be employed without a corresponding use of other features. Accordingly, it is appropriate the the appended claims be construed broadly and in a manner consistent with the spirit and scope of the invention herein.

What is claimed is:

1. A contacting tower for separating a feed stock through the countercurrent contact of a dispersed phase, comprising an elongated column formed with an internal chamber, a plurality of annular stator rings spaced apart from each other and mounted in said internal chamber to form a series of vertically disposed compartments, a rotor including a shaft rotatably mounted in said internal chamber and a plurality of rotor blades mounted on said shaft such that each of said rotor blades is disposed within each of said compartments, means for conveying said feed stock into one of said compartments, means for conveying a hydrocarbon solvent into one of said compartments, means for conveying a wash oil solvent out of one of said compartments which is located above the compartment receiving said feed stock, said stator rings being separated into an upper group of rings and a lower group of rings such that an enlarged central compartment is formed which is medially located with respect to the vertical axis of said column, means in said central compartment for reducing the movement of said dispersed phase including an annularly shaped accumulator basin formed with a plurality of perforations for receiving a portion of said dispersed phase, and means for recycling said portion back to said upper group of rings.

2. A contacting tower according to claim 1 in which said accumulator basin is defined by a pair of spaced apart grids formed with perforations and separated by a frustoconically shaped wall.

3. A contacting tower according to claim 2 in which said central compartment is defined by an upper calming grid and a lower calming grid formed with perforations.

4. A contacting tower according to claim 3 in which a weir in the shape of a cylindrical baffle is mounted on said upper calming grid.

5. A contacting tower according to claim 4 in which said cylindrical baffle is coaxially positioned with respect to said shaft and is equidistantly spaced between said shaft and the wall of said internal chamber.

* * * * *